March 19, 1963
E. HAJOS
3,081,996
TOWEL STACKING SYSTEM
Filed May 25, 1960
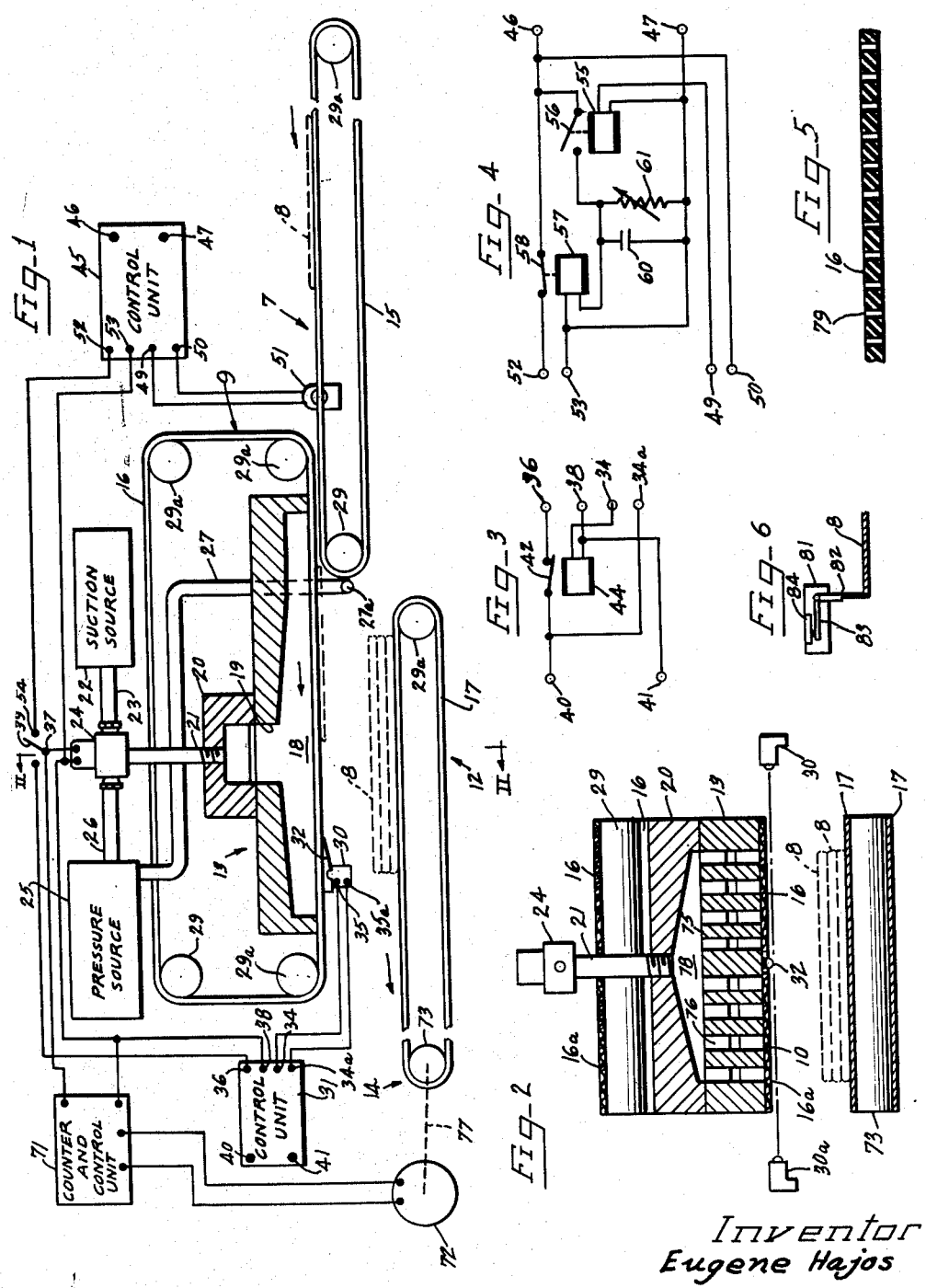
Inventor
Eugene Hajos

United States Patent Office 3,081,996
Patented Mar. 19, 1963

3,081,996
TOWEL STACKING SYSTEM
Eugene Hajos, Chicago, Ill., assignor to Hydraxtor Company, Skokie, Ill., a corporation of Illinois
Filed May 25, 1960, Ser. No. 31,746
6 Claims. (Cl. 271—74)

This invention relates to a method and means for stacking fabric sheet material and is more particularly directed to an improved method and means for vacuum stacking sheets, towels, linens, and other substantially flat fabric materials.

It has been customary in the art of manufacturing such fabric sheet materials to stack the finished product by hand. Similarly, hand-stacking of fabric flatwork in laundries is common practice.

The fabric sheet material here involved was normally conveyed to a removal station by endless conveyor belt arrangements where the sheet of fabric material was removed manually and stacked in the appropriate number for subsequent storage, packing, shipping, etc.

By employment of my invention, I overcome the problems of the prior art and provide means for automatic removal and stacking of such fabric materials in any desired quantity.

It is therefore an object of the present invention to provide a device for automatic removal of flat fabric and fabric-like sheet materials from conveyors.

It is another object of the present invention to provide automatic means for removal and stacking of fabric and fabric-like materials.

It is still another object of the present invention to provide means for the automatic removal of fabric and fabric-like materials from conveyors and for the automatic stacking of such materials in any desired quantity.

It is a further object of the present invention to provide means for continuous and automatic removal of sheets of fabric and fabric-like materials from conveying means and the stacking of said sheets in quantities of any desired number and for continuous removal of said stacks when the desired stack quantity has been obtained.

It is another object of the present invention to provide apparatus for the automatic and continuous removal of fabric and fabric-like sheet material from one conveying means and the stacking thereof in desired quantities on another conveying means and continuous removal of said stacks of desired stack quantity seriatim.

It is a further object of the present invention to provide a method for automatic vacuum removal of sheet-like fabric materials from one conveying means and the deposit thereof on another conveying means.

These and other objects and advantages of the present invention will become more apparent during the course of the following description, particularly when taken in conjunction with the accompanying drawing wherein:

FIGURE 1 is a side elevational view in partial section of apparatus constructed in accordance with the principles of this invention;

FIGURE 2 is a transverse sectional view taken along lines II—II of FIGURE 1;

FIGURE 3 is a view illustrating schematically an electrical circuit of a control unit of FIGURE 1;

FIGURE 4 is a view illustrating schematically an electrical circuit of another control unit of FIGURE 1;

FIGURE 5 is a sectional view taken longitudinally through a form of vacuum transfer conveyor belt; and FIGURE 6 is a modification of the switch means employed with my invention.

Briefly stated, the present invention is directed to an automatic device for vacuum or suction removal of a flat sheet-like fabric material from one conveying means and the automatic release of the suction forces at a position above second conveying means whereby gravitational forces, with or without the assistance of additional pressure forces, deposit the sheet material on the second conveying means wherein the sheet material itself acts as the means for interrupting the application of suction or vacuum forces thereon.

A preferred embodiment of the concepts of my invention appears in FIGURE 1 wherein three separate conveying means in the form of endless belt arrangements are shown. A first conveying means 7 is positioned so as to deliver a member of sheet material 8, such as a towel, in proximity to an intermediate transfer means 9, which transfers and drops the towels one-by-one onto a stacker and removal conveyor 12. A suction or vacuum housing 13 is associated with the transfer means 9, to hold the towels during the transfer and to control release thereof onto the removal conveyor 12. When a certain number of towels have been stacked on the removal conveyor 12, it is actuated to carry the stack to a removal point 14.

The conveying means 7 comprises an endless belt 15. The transfer means 9 may preferably comprise a pair of belts 16 and 16a in side-by-side relation (see FIG. 2), although it is also possible to use a single belt, as will be described hereinafter. The removal conveyor comprises an endless belt 17. The foraminous dual belts 16 and 16a may be constructed of a porous fabric, or a non-porous material with perforations therein in an amount sufficient to permit the application of suction or vacuum forces therethrough against the sheet material 8.

The vacuum housing 13, employed for applying suction through the belts 16 and 16a, defines a chamber 18, preferably tapered as shown, so shaped as to insure maximum equalization of suction over the entire chamber area. An inlet 19, preferably complementarily tapered, is provided for communication with a vacuum source chamber defined by a boss 20 adapted to receive in threaded engagement therewith a centrally located conduit 21 communicating with a suction or vacuum source 22 through a conduit 23 and valve means 24 which may be in the form of a conventional solenoid valve.

Optionally, a pressure source 25 may be employed in conjunction with the suction source, so that when the application of suction forces are interrupted, the solenoid of valve 24 automatically permits communication between the pressure source 25 through a conduit 26 and conduit 21 to thereby assist the gravitational forces in the deposit of the sheet material 8 onto the stacker and removal conveyor 12. The pressure source 25 may be a conventional pump adapted to supply air or an inert gas through conduit 21.

The pressure source 25 is also connected to a conduit 27 having a horizontal portion 27a underlying the belts 16, 16a adjacent the end of the conveyor 7. The portion 27a has apertures in its upper side, along its length, to develop a series of air jets which impinge on the lower surface of each towel as it moves past the end of the conveyor 7, to hold the towel up against the belts 16, 16a. In the arrangement as shown, the vacuum chamber 18 overlies the end portion of the conveyor 7 so that the air jets are not absolutely essential, although their use is preferred to insure reliable operation. It is also possible to use a construction in which the end of the vacuum chamber 18 is spaced from the end of the conveyors 7. In that event, the use of the air jets is even more desirable, if not essential, to insure that the towel be held against the belts 16, 16a until the vacuum can take effect.

FIGURE 2 illustrates the internal arrangement of the integral plenum chamber within housing 13. As shown, the plenum chamber comprises a series of longitudinal segments 75 defining therebetween longitudinally extending suction passages 76. The chamber 18 is preferably of the same width as the width defined by dual belts 16 and 16a to provide even and uniform distribution of vacuum forces through the dual belts. The partition segments 75 may be longitudinally tapered as shown to insure equal distribution of suction forces in the passages 76 from the preferably transversely tapered inlet equalization chamber 78 which is in communication with the conduit 21.

To control energization of the solenoid valve 24 when the towel reaches a certain position, a photoelectric cell 30 is located on one side of the transfer belts 16, 16a and is connected to a control unit 31. A light source 30a is located on the other side thereof to direct a beam of light toward the photoelectric cell 30 along a transverse path slightly below the belts. To insure that the leading edge of the towel will interrupt the beam, a wedge-shaped separator member 32 is disposed between the belts 16, 16a on the lower side of the housing. It will be noted that the use of two belts 16, 16a permits this use of the separator member 32.

FIGURE 3 illustrates the circuit of the control unit 31. Terminals 34 and 34a thereof are connected to photoelectric cell terminals 35 and 35a. A terminal 36 is connected through a manual transfer switch 39 to one terminal of the solenoid valve 24 and terminal 38 is connected to the other terminal of the solenoid valve 24. Terminals 40 and 41 are connected to a suitable energization means (not shown) such as a source of 110 volt, 60 cycle current, terminal 40 being connected to terminal 34a and terminal 41 being connected to terminal 34a and terminal 41 being connected to terminal 38 and through a relay 44 to the terminal 34.

In operation, the beam of light from light source 30a impinged on photoelectric cell 30 reduces its resistance, energizes the relay 44 and opens the contact 42 to deenergize the solenoid of the valve 24 thereby permitting the application of suction forces against the towel 8 through the belts 16, 16a.

When the leading edge of the towel contacts the separator 32 centrally supported between belts 16 and 16a, the central portion of the leading edge thereof is deflected downwardly to interrupt the beam of the photoelectric cell 30 thereby increasing the resistance of the photoelectric cell and thereby deenergizing the relay 44 to allow contact 42 to close which in turn energizes the solenoid of valve 24 to admit air at atmospheric pressure to the plenum chamber 18 or, if a pressure source is utilized, to permit the application of pressure against the belts 16 and 16a to assist in removal of the towel 8.

With the towel removed, the resistance of the photocell is again reduced and relay 44 energized, contact 42 is opened and solenoid valve 24 is denergized to thereby once again permit the application of suction forces through the belts 16 and 16a for the transfer of the next towel to the conveyor 12 and the cycle is then repeated.

By control of the manual transfer or selector switch 39, a control unit 45 may be used instead of the control unit 31. Control unit 45 is connected by terminals 46 and 47 to a suitable energizing source (not shown) and a pair of terminals 49 and 50 are connected to a photoelectric cell 51 adjacent the upper surface of belt 15 in alignment with a light source, not shown. Terminal 52 is connected to terminal 54 of selector switch 39. Terminal 53 is connected to the solenoid valve 24.

With selector switch 39 engaged with contact 54, the operation is as follows: The light on the right hand photocell 51 (FIGURE 1) reduces resistance to thereby energize a relay 55 and close a normally opened contact 56 thereof. Closing of contact 56 energizes a relay 57 and opens its contact 58 thereby deenergizing the solenoid of valve 24 through switch 39. Thus suction forces are applied through the chamber 18 and belts 16 and 16a and against the towel 8. When a towel on conveyor means 7 interrupts the beam of photocell 51, the resistance of the photocell increases thereby deenergizing the relay 55 and permits opening of contact 56. However, relay 57 is not immediately deenergized due to the charge thereon of capacitor 60, but, after a certain time interval determined by the resistance of adjustable resistor 61, relay 57 is deenergized and its contact 58 is opened to deenergize the solenoid of valve 24 and to admit air at atmospheric pressure to the plenum chamber 18 or, if a pressure source is employed, to permit the application of pressure forces to assist in removal of the towel 8 onto conveyor 12. The time interval lag for deenergization of relay 57 is synchronized with the speed of belt 15 and dual belts 16 and 16a to assure proper operation of valve 24 in order that the towels will be removed from the conveyor 9 at the proper time to thereby permit stacking of the towels on belt 17.

It is noted that belt 15 and duel belts 16 and 16a are mounted on drive rollers 29 and idler rollers 29a, the drive rollers 29 being driven by suitable means, not shown, at a constant speed such that the linear speeds of the belts are substantially the same.

It should further be noted that with the control unit 45 and associated photocell 51 in operation, dual belts 16 and 16a are not required. A single belt could be used.

Automatic and adjustable means are provided to permit any desired variation in the number of towels stacked and removed at one time from the belt 17. A counter and control unit 71 in circuit with a motor 72 is adapted to actuate driving roller 73 of the conveyor 12. The counter is adjustable and may be set to trigger the control unit associated therewith depending upon the predetermined number of towels desired stacked on the conveyor 12.

The counter and control unit 71 may be employed either with the control unit 31 or the control unit 45. For this purpose, counter 71 is connected in parallel with the solenoid valve 24 to be energized with each energization of the valve 24. When the counter has been energized a predetermined number of times, depending upon the number of towels desired to be stacked on conveyor 12 for removal, the motor control of unit 71 is energized and causes motor 72 to drive roller 73 through common shaft means 77. The stack of towels of the desired number are then rapidly moved on the conveying belt 17 to the removal station 14, or to a position such as to permit stacking of another group of towels. The motor 72 is then deenergized. The speed of movement of belt 17 is rapid so as to permit continued stacking without interruption.

As aforementioned, the belt 16 of the transfer conveyor 9 may be a porous fabric belt or a non-porous belt having a plurality of holes or perforations 79 (FIGURE 5).

As an alternative to employment of the photoelectric cells 30 and 51 and as appears in FIGURE 6, a microswitch 81 has pivotally mounted thereon an L-member 82 adapted to be contacted by the towel 8 for movement thereof whereby the leg 83 of the L-member engages the contact 84 of the microswitch to actuate either control unit 31 or 45.

In operation therefore when control unit 31 is employed, the towel 8 is moved by the conveyor belt 15 to a position at which it is picked up by the dual transfer belts 16 and 16a with the assistance of the air jets produced through the apertures 27a formed in the conduit 27 and is transferred into the suction zone of the chamber 18 where the suction forces acting through the dual belts 16 and 16a carry the towel against the underside thereof to the suction release point. The central part of the leading edge of the towel is deflected downwardly by the separator 32 and interrupts the beam of light to the photoelectric cell 30 which energizes the solenoid valve 24 and interrupts the suction forces, thereby permitting gravitational force to act on the towel and deliver it to the conveyor 12. If desired, the pressure source 25 may be tapped into the suction conduit to assist gravitational forces in delivering the towel to the stacking and removal conveyor 12.

With the towel removed from the photocell beam, the control unit 31 deenergizes the solenoid of valve 24 and permits suction forces to again act in the chamber 18.

If the pressure source 25 is employed deenergization of the control unit and solenoid valve 24 prevents pressure forces from being introduced into the valve conduit 21. The cycle is again automatically repeated with the next towel. When the predetermined number of towels have been stacked the counter of the unit 71 energizes motor 72 and drives the belt 17 to the removal station 14. It will be appreciated that all of the electrical components and the speeds of the respective belts are synchronized to provide proper operation of the overall system.

Utilization of an auxiliary or alternative control unit 45 is particularly advantageous in the event of malfunction in the control unit 31. Control unit 45 and photocell 51 operate in substantially the same manner as heretofore described with regard to control unit 31 and photocell 30 with the noted exception that relay 57 is employed to delay energization of the system to permit the towel to reach the suction means 13. Alternatively, in place of either photocell 30 or 51, the microswitch device of FIGURE 6 may be employed.

It will therefore be appreciated that by my invention I provide automatic vacuum means for the stacking of sheet and sheet-like fabric materials in any desired number and for the sequential and automatic removal of such stacks as a function of the number of sheets per stack.

While preferred embodiments of the invention have been shown and described, various other modifications and substitutions of equivalents will occur to those skilled in the art after a study of the foregoing disclosure. It should be understood, however, that I wish to embody within the scope of the patent warranted hereon all such embodiments as reasonably and properly come within the scope of my contribution to the art.

I claim as my invention:

1. Apparatus for automatically stacking and removing substantially flat sheets of fabric and fabric-like material comprising: first means for conveying sheets of said material; second intermediate pervious conveying means adapted to receive and to carry said sheets; means for applying vacuum forces through said second conveying means to hold each of said sheets to the underside of said second conveying means against gravitational forces; third conveying means adapted to receive and to transfer said sheets to a removal station; electrical means including an electrically actuatable device for interrupting the application of said vacuum forces to thereby permit gravitational forces to act on each of said sheets to deposit said sheets on said third conveying means and means for applying pressure against each of said sheets to assist the gravitational forces in depositing said sheet on said third conveying means.

2. In a system for handling flat sheets of fabric and fabric-like material, a pair of conveyor belts arranged in parallel side-by-side relation to receive the sheets, means for driving said belts, and means for sensing when a sheet is moved to a certain position, comprising: photo cell means, light source means adapted to project a beam of light transversely adjacent said belts to said photo cell means across the path of a sheet on a belt, and a deflector member supported between said belts having an inclined surface adapted to deflect a central portion of the leading edge of a sheet into the path of said beam of light.

3. In apparatus for automatically stacking substantially flat sheets of flexible material, housing means defining a plenum chamber having an open downwardly facing side, pervious endless conveyor belt means, roller means supporting said belt means with a generally horizontal portion thereof against said downwardly facing open side of said chamber, means for driving said roller means to cause movement of said horizontal portion of said belt means from one end to the other of said open side of said chamber, means adjacent said one end of said chamber for engaging at least a leading edge portion of a sheet against the underside of said horizontal portion of said belt means, a suction source, a pressure source, selector valve means for connecting said sources to said plenum chamber, and means for controlling said valve means to normally couple said vacuum source to said chamber until the leading edge of the sheet reaches a certain position adjacent said other end of said open side of said chamber and to then couple said chamber to said pressure source to create a force aiding gravity in dropping the sheet from said belt means.

4. In apparatus for automatically stacking substantially flat sheets of flexible material, housing means defining a plenum chamber having an open downwardly facing side, pervious endless conveyor belt means, roller means supporting said belt means with a generally horizontal portion thereof against said downwardly facing open side of said chamber, means for driving said roller means to cause movement of said horizontal portion of said belt means from one end to the other of said open side of said chamber, means adjacent said one end of said chamber for engaging at least a leading edge portion of a sheet against the underside of said horizontal portion of said belt means, a suction source, valve means for coupling said vacuum source to said chamber to hold a sheet against said underside of said horizontal portion of said belt means, a light source arranged to project a beam of light transversely adjacent the underside of said horizontal portion of said belt means, means for engaging under and deflecting the leading edge portion of a sheet downwardly to interrupt said light beam, and means including photocell means in the path of said light beam for closing said valve means in response to interruption of said light beam by a deflected leading edge portion of a sheet.

5. In apparatus for automatically stacking substantially flat sheets of flexible material, housing means defining a plenum chamber having an open downwardly facing side, pervious endless conveyor belt means, roller means supporting said belt means with a generally horizontal portion thereof against said downwardly facing open side of said chamber, means for driving said roller means to cause movement of said horizontal portion of said belt means from one end to the other of said open side of said chamber, means adjacent said one end of said chamber for engaging at least a leading edge portion of a sheet against the underside of said horizontal portion of said belt means, a suction source, valve means for coupling said suction source to said chamber to hold a sheet against the underside of said horizontal portion of said belt means, and means for opening said valve means when the sheet reaches a certain position, said housing means including a plurality of horizontal segments engaging transversely spaced portions of the upper side of said horizontal portion of said belt means and defining longitudinally extending suction passages in said plenum chamber with an inlet equalization chamber portion centrally above said segments.

6. In apparatus for automatically stacking substantially flat sheets of flexible material, housing means defining a plenum chamber having an open downwardly facing side, pervious endless conveyor belt means, roller means supporting said belt means with a generally horizontal portion thereof against said downwardly facing open side of said chamber, means for driving said roller means to cause movement of said horizontal portion of said belt means from one end to the other of said open side of said chamber, means adjacent said one end of said chamber for engaging at least a leading edge portion of a sheet against the underside of said horizontal portion of said belt means, a suction source, valve means for coupling said suction source to said chamber to hold a sheet against the underside of said horizontal portion of said belt means, and means for opening said valve means when the sheet reaches a certain position, said housing means including a plurality of horizontal segments engaging transversely spaced portions of the upper side of said horizontal portion of said belt means and defining longitudinally extending suction passages in said plenum chamber with an inlet equalization chamber portion centrally above said segments, said segments being longitudinally tapered and said equalization chamber being transversely tapered for equalizing the distribution of suction forces.

References Cited in the file of this patent

UNITED STATES PATENTS

| | | |
|---|---|---|
| 1,077,399 | Droitcour | Nov. 4, 1913 |
| 2,517,388 | Daves | Aug. 1, 1950 |
| 2,772,880 | Garrett | Dec. 4, 1956 |
| 2,813,637 | Perry et al. | Nov. 19, 1957 |